United States Patent [19]

Schwarzer

[11] 3,800,094

[45] Mar. 26, 1974

[54] CENTRALLY CONTROLLED TELEPHONE SYSTEM HAVING MEANS FOR SENSING AND EVALUATING CHANGES OF THE STATES OF LOOPS

[75] Inventor: Michael Schwarzer, Hofheim, Tannus, Germany

[73] Assignee: Telefonbau und Normalzeit GmbH, Frankfurt/Main, Germany

[22] Filed: Mar. 14, 1972

[21] Appl. No.: 234,629

[30] Foreign Application Priority Data

Mar. 17, 1971 Germany........................... 2112872

[52] U.S. Cl. ............................................ 179/18 FG

[51] Int. Cl. ............................................ H04m 3/22

[58] Field of Search ....... 179/18 AB, 18 FF, 18 FG, 179/7.1 R

[56] References Cited

UNITED STATES PATENTS

| | | | |
|---|---|---|---|
| 3,692,944 | 9/1972 | Durteste et al. | 179/18 FF |
| 3,562,436 | 2/1971 | Lutgenau | 179/18 FF |
| 3,532,827 | 10/1970 | Ewin | 179/18 FF |
| 3,524,933 | 8/1970 | Risky | 179/18 FG |

*Primary Examiner*—Thomas W. Brown
*Attorney, Agent, or Firm*—Erwin Salzer

[57] ABSTRACT

A telephone system having a central station includes means for sensing and evaluating the states of loops of subscribers. The states of the loops of subscribers are scanned periodically, and compared with their states during a preceding scanning cycle. This comparison is achieved by a state comparator. Three kinds of information are established in regard to the state of a loop of a subscriber, i.e., information relating to the present state of the loop of a subscriber, information relating to the state of the loop of the same subscriber during the preceding scanning cycle, and information relating to the duration of the state of the loop that had been determined during the preceding scanning cycle. If a change of state occurred, the state comparator determines by means of appropriate circuitry whether a holding operation, breaking of a connection, or interruption of predetermined duration of a loop is involved. The state comparator then transmits an appropriate signal to the central station and its central control unit. A state storage means is provided for storing information relative to the states of the loops of the individual subscriber stations during one scanning cycle. The system further includes a counting storage means for storing information relating to the duration of the states of the loops. The output of a plurality of AND-gates is transmitted to the central control unit of the central station. Each of these AND-gates has three inputs, i.e., an input being the output of the aforementioned state storage means, an input derived from one of a plurality of state lines connected to the subscriber stations, and an input derived from said counting storage means by the intermediary of a decoder.

4 Claims, 3 Drawing Figures

CENTRALLY CONTROLLED TELEPHONE SYSTEM HAVING MEANS FOR SENSING AND EVALUATING CHANGES OF THE STATES OF LOOPS

BACKGROUND OF THE INVENTION

This invention refers to an improved telephone system of the kind wherein the state of the loops of the several individual subscriber stations is scanned in a cyclic sequence, and compared by means of a state comparator with the state of any particular loop during the preceding scanning cycle.

In extension telephone systems the need often arises to make it possible for an extension station to talk to another extension station in a period of time during which a connection of said first mentioned extension station set-up by a central office is maintained. In other words, call-back conversation should be possible between two extensions without interrupting the connection of one of them with the central office, interrupting only the talking path of one of the extensions, or calling extension station, to a called subscriber station. This may be achieved by means of a so-called ground key forming part of the calling extension station. If that key is depressed in the course of a call the connection of which has been set up by the central office, a signal is generated which is used to select the other extension. Another or second depression of that key re-establishes the original connection with the central office.

A number of so-called call-back telephone systems have been evolved all of which are predicated on grounding of subscriber loops. It is, however, undesirable to produce call-back signals by loop grounding. Besides, not all extension telephone systems lend themselves to grounding.

Another criterion for effecting a call-back is the interruption of subscriber loops during certain periods of time.

The present invention is predicated upon the aforementioned criterion, and provides centrally located means for identifying interruptions of subscriber loops intended to initiate back-calls, and for processing such interruptions.

SUMMARY OF THE INVENTION

In systems embodying this invention each of a plurality of subscriber stations comprises means including a decoder for determining whether an address transmitted to the particular subscriber station in binary coded form corresponds to the calling number of the particular station. Each subscriber station further comprises means for transmitting present state signals indicative of the present state of the loop thereof to a central station in case that there is such correspondence.

The central station includes a clock-controlled state scanner made up of a plurality of units as follows:

An address transmitter for transmitting addresses of subscriber stations in binary coded form to the decoders in the subscriber stations.

Storage means capable of emitting past states of loops signals indicative of the states of loops during previous scanning cycles.

A logic circuitry having two input terminals and one output terminal which emit signals only if signals applied to said two input terminals differ from each other, said input terminals receiving simultaneously past states of loops signals from said storage means and present states of loops signals transmitted from said subscriber stations.

Counting means for determining the state-time during which the states of loops determined during a previous scanning cycle prevailed.

A state of loop evaluating circuitry whose inputs are present states of loops signals, past states of loops signals and state-time signals, said evaluating circuitry including AND-gates (8, 9, 10) having outputs derived from combining said present states of loops signals, said past states of loops signals, and said state-time signals.

A central control unit is supplied with the outputs of said evaluating circuitry, i.e., the outputs of said AND-gates thereof.

DESCRIPTION OF PREFERRED EMBODIMENT

Figure 1:
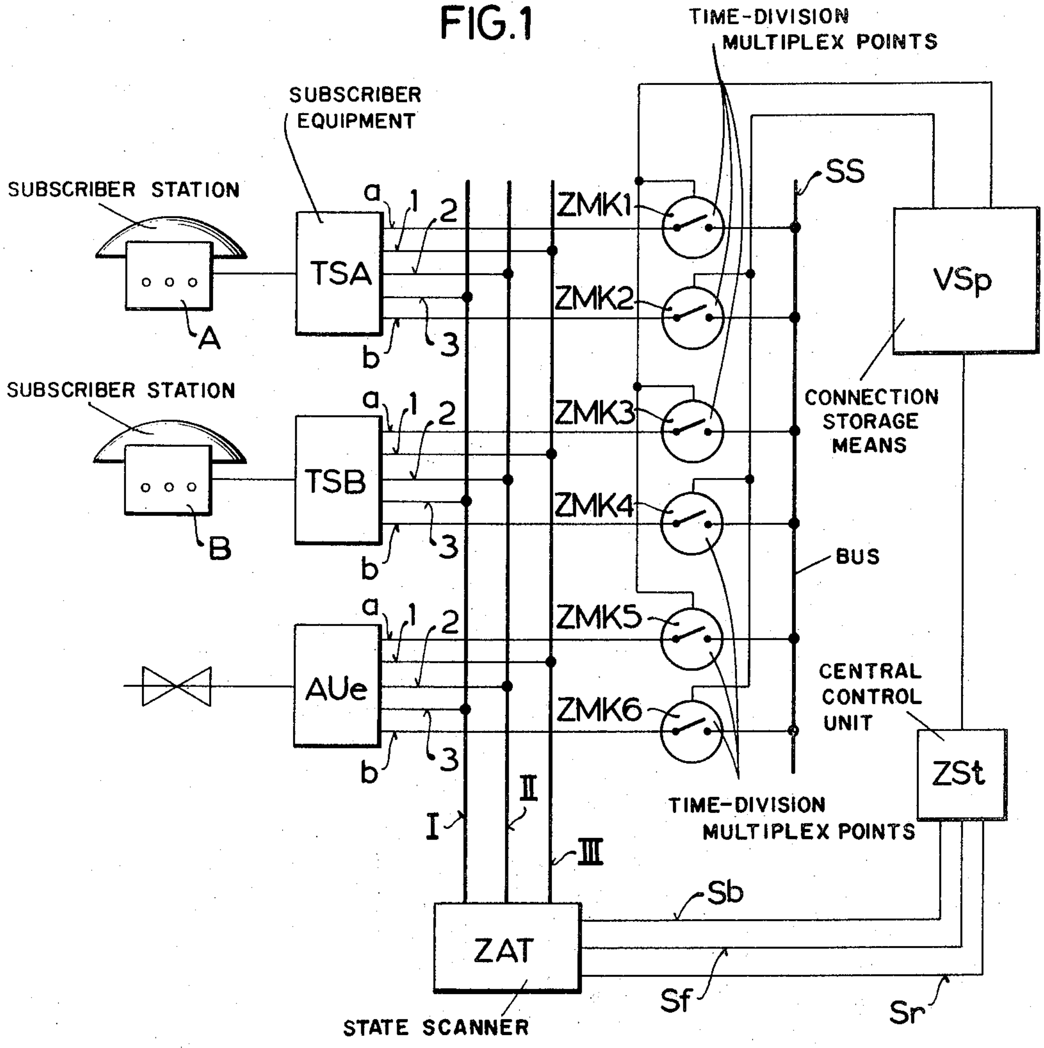
FIG. 1 is a block diagram of a multiplex time-division telephone system for selection by direct keying or key pulsing, including the central office thereof.

FIG. 1 shows a time-division multiplex system including two extensions and an office repeater or office transducer. The invention, however, is not limited to time-division multiplex systems.

The sets A and B of the two extensions are each connected to its respective subscriber equipment TSA and TSB. The subscriber equipment TSA is provided with two talk leads *a,b* which are connected to time-division multiplex bus SS by the intermediary of time-division multiplex coupling points ZMK1 and ZMK2. In the same fashion, subscriber equipment TSB is connected by the intermediary of time-division multiplex coupling points ZM3 and ZM4 to time-division multiplex bus SS. The talk leads *a,b* of the central office repeater or office transducer AUe arranged parallel to the subscriber equipment TSA and TSB are connected to time-division multiplex bus SS by the intermediary of time-division multiplex points ZMK5 and ZMK6. Each of units TSA, TSB and AUe is connected by means of three signalling leads 1,2,3 to state line I and address lines II and III. Lines, I,II,III are connected to a state scanner ZAT. The scanner ZAT is connected by three lines S*b*, S*f*, S*r* to the central control unit ZST which controls a connection storage means VSp. The latter is preferably a circulating storage device or register. Connection storage means VSp make it possible to open and close the multiplex time-division coupling points ZMK1 . . . ZMK6 of the subscriber stations which happen to communicate with each other in any given instant in accordance with Shannon's sampling theorem.

Figure 2:
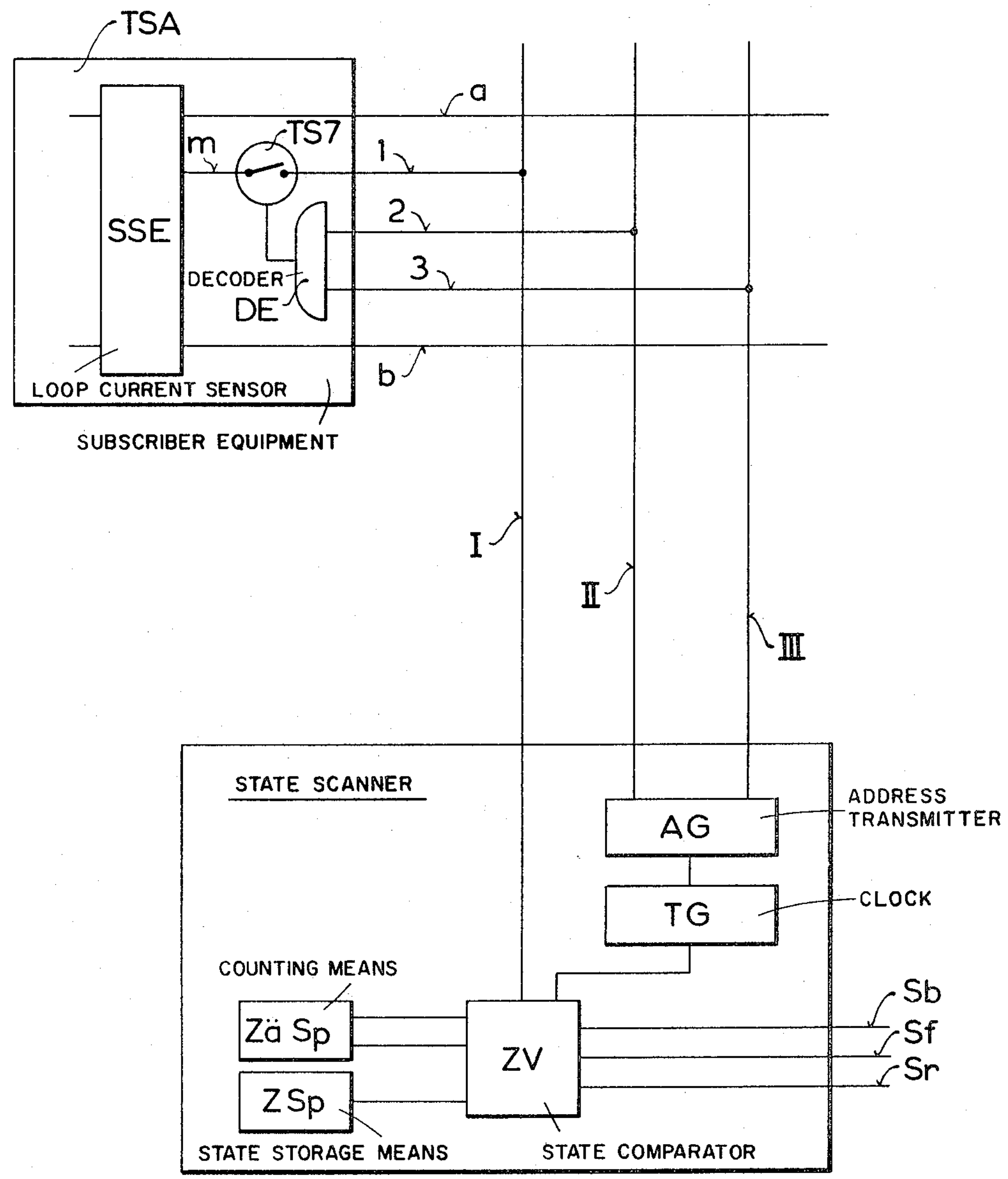
FIG. 2 is a block diagram of a subscriber station for selection by direct keying, or key pulsing, and of its connection with a central state scanner.

Referring now to FIG. 2, the same reference characters have been applied in that figure as in FIG. 1 to designate like parts. The subscriber equipment TSA includes a loop current sensor SSE, a gate TS7 and a decoder DE. The latter may be an AND-gate having two inputs and, therefore, capable of decoding a 2 bit address. Signal line 1 connects the subscriber equipment TSA to state line I, and signal lines 2,3 connect equipment TSA to address lines II and III, while talk leads a and b are connected as shown in FIG. 1 and described in connection with this figure.

The state scanner ZAT includes a state comparator ZV, a counting storage means *ZaSp*, a state storage means ZS*p*, an address transmitter AG and a clock or timing monitor TG.

The clock or timing monitor TG delivers in periodic intervals pulses to address transmitter AG, as a result of which the latter transmits in a cyclic sequence the address of the various subscribers to address lines II, III. The addresses are transmitted in binary coded form. The decoder DE then determines whether or not the address which has been transmitted corresponds to the calling number of the subscriber station TSA. If this is the case gate TS7 opens. As a result, the present state value m is transmitted by means of state line I to state comparator ZV. This state value *m* is compared by state comparator ZV with the state value of the same subscriber equipment TSA prevailing during the preceding scanning cycle. The information necessary for such a comparison is supplied by state storage means ZS*p*. to enable state comparator ZV to determine whether the new state value relates to holding S*b* of a subscriber line, a break of connection S*f*, or operation of a call-back key S*r*, the counting storage means *ZaSp* supplies the state comparator ZV with a two bit counting information at the same time as the state storage means ZS*p* supplies its information to state comparator ZV. The latter then emits one of the three signals S*b*, S*f* or S*r* to the central control unit ZS*t*, and the latter receives simultaneously from address transmitter AG the address of the subscriber station A.

Figure 3:
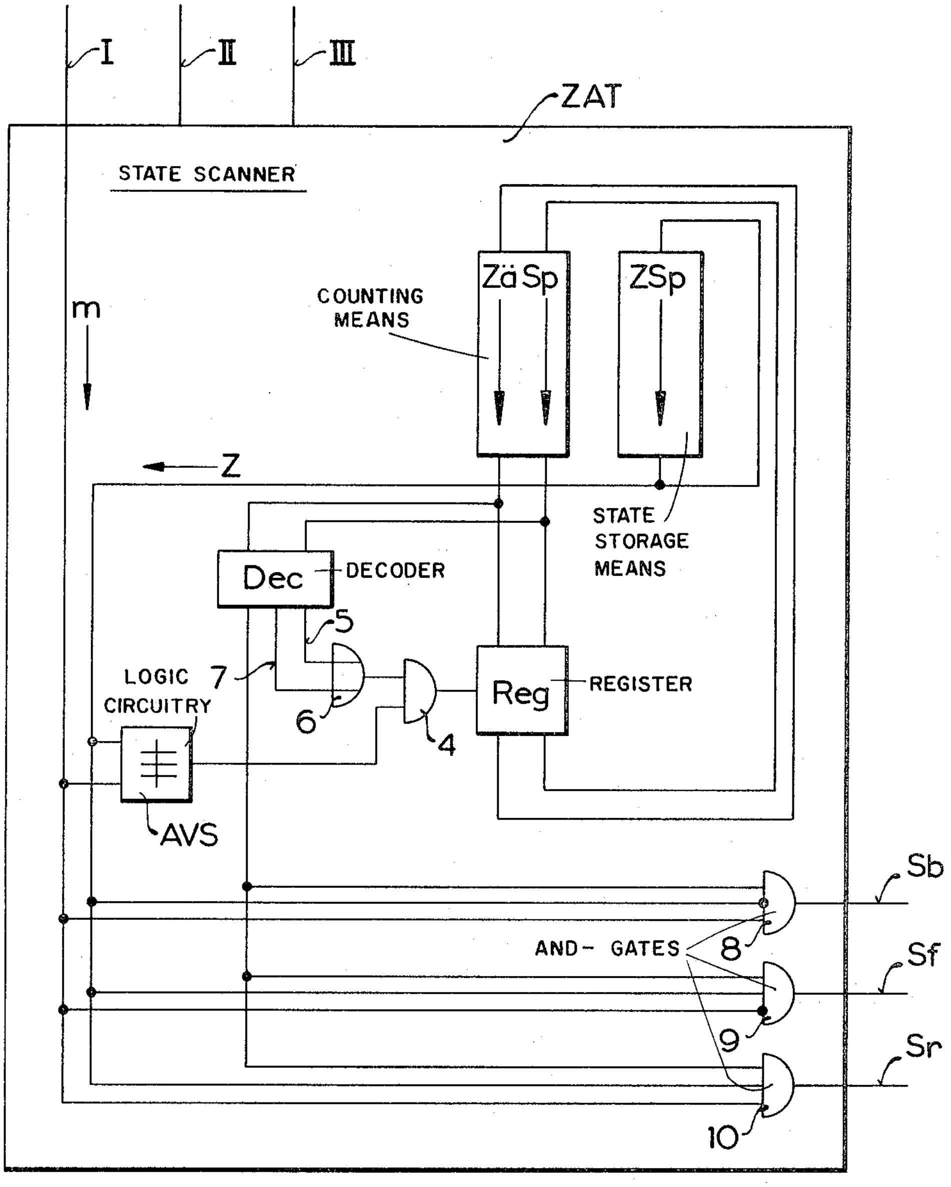
FIG. 3 is a block diagram showing the internal wiring of a central state scanner.

The way in which signals S*b*, S*f*, S*r* are generated will now be described more in detail in connection with FIG. 3. The latter shows the internal wiring of the state scanner ZAT without the clock or timing monitor TG and without the address transmitter AG. Let us assume that the subscriber station A is initially idle. When the subscriber at station A lifts his set, state $m(1)$ is transmitted by way of state line I to the first input of logic circuitry AVS having two input terminals and one output terminal which emits a signal only if the signal applied to the second input terminal differs from that applied to the first input terminal. Such a logic circuit may be referred to as antivalence gate. At the same time information relating to the state of the subscriber station TSA during the previous scanning cycle is transmitted from state storage means ZS*p* — which is preferably a circulating storage device — to the second input terminal of the logic circuitry AVS. The previous state may hereinafter generally be referred to as Z. The logic circuitry AVS then determines that $m(1) \neq Z(0)$ and therefore, transmits a signal to the AND-gate 4. At the same time another signal is transmitted to AND-gate 4 which signal is sent out by counting storage means *ZaSp*. The counting storage means *ZaSp* sends out the time information $t(0)$ at the same time the state storage means sends out its signal Z(0). This time information may be expressed by the bits 00. When these bits are supplied to the decoder Dec, they are transformed into an L signal which is transmitted to line 5 and hence to one of the input terminals of OR-gate 6. The output terminal of OR-gate 6 is connected to the second input terminal of AND-gate 4. As a result, a signal is transmitted from the output terminal of AND-gate 4 to the register Reg. This causes an increase of one time unit of the time $t(0)$ heretofore stored in register Reg so that the time value now stored in it is $t(1)$. This new time value $t(1)$ is then transmitted to the counting storage means *ZaSp*. Upon completion of one cycle of storage counting means *ZaSp* it emits a two bit output signal OL. The latter is transformed by the decoder Dec into an L signal and transmitted by line 7 to one of the input terminals of OR-gate 6. The subsequent steps then occur in a fashion similar to those which occurred during the first cycle of the counting storage means *ZaSp*. Following two operating cycles the counting storage means *ZaSp* has a time value output $t(2)$. Time value $t(2)$ and the jointly emitted signals $m(1)$ and Z(0) cause an output to appear on AND-gate 8. Thus a request signal S*b* for a new holding is transmitted to the central control unit ZS*t*. After this signal has been received by the central control unit ZSt $Z=m$ is written into the state storage means ZS*p* and the counting storage means *ZaSp* is cleared.

Breaking of a connection involves, in principle, the same steps as those set forth above.

If the subscriber station TSA emits a state value $m(0)$ when two cycles of the storage means *ZaSp* and ZS*p* have elapsed, and if the information Z(1) had been stored in the state storage means ZS*p* during that period of time, the following constellation then exists: $m(0)$, Z(1), $t(2)$. This constellation results in an output of AND-gate 9 and transmission of a request signal S*f* to the central control unit ZS*t*.

The signal S*r* which indicates that the call-back key has been operated is produced in a fashion which corresponds to the production of signals S*b* and S*f*.

A prerequisite for initiating a call-back operation is a pre-existence talk, i.e., Z(1) must be stored in the state storage means ZS*p*. Upon operation of the call-back key the value $m(0)$ is established temporarily because the loop has been interrupted for a predetermined time interval. As in the case of interruption or breaking of a connection, the counting storage means ZaSp is shifted forward with each cycle. If the interruption of the loop is terminated during the second cycle, the following constellation is established following the second cycle: $m(1)$, Z(1), $t(2)$. As a result of this constellation an output signal S*r* appears at the output terminal of AND-gate 10 which signal is transmitted to the central control unit ZSt.

All holding operations whose duration is less than two scanning cycles and all connection breaking operations having a duration of less than one cycle result in automatic clearing or cancellation and hence restoration of the initial state. Thus disturbances may be avoided. The duration of a cycle of the state scanner depends upon the duration of the loop interruptions to be observed. For instance, if the duration of a cycle is 40 m sec. then loop interruptions having a duration *d* are sensed as call-back operations if 40 m sec. $< d <$ 80 m sec.

The operation of a telephone system embodying this invention has been described above with specific reference to two scanning cycles. It is, however, possible to consider any number of such cycles. This merely calls for an increase of the capacity of counting storage *ZaSp*.

State storage means ZS*p* and counting storage means *ZaSp* are preferably combined in the form of one single circulating storage device.

I claim as my invention:

1. A centrally controlled telephone system including means for determining and evaluating the states of loops of subscriber stations, particularly call-back requests, including means for scanning the states of the loops of subscriber stations during sequential scanning cycles, and state comparator means for comparing present states of subscriber loops with states of loops prevailing during preceding scanning cycles wherein 1. said subscriber stations (A,TSA;B,TSB) comprises means including decoders (DE) for determining whether an address transmitted to the subscriber stations in binary coded form corresponds to the calling numbers of the subscriber stations and further comprise means for transmitting present state of loops signals (*m*) indicative of the present states of the loops thereof to a central station in case there is such correspondence; and wherein
2. a clock-controlled state scanner (ZAT) located at the central station comprises
   a. an address transmitter (AG) for transmitting addresses of subscriber stations in binary coded form to said decoders in said subscriber stations;
   b. state storage means (ZS*p*) capable of emitting past states of loops signals (Z) indicative of the states of loops during previous scanning cycles;
   c. a logic circuitry (AVS) having two input terminals and one output terminal which emits signals only if signals applied to said two input terminals differ from each other, said input terminals receiving simultaneously past states of loops signals from said state storage means and present state of loops signals transmitted from said subscriber stations;
   d. counting means (Z*a*S*p*,Reg) for determining the state-time (*t*) during which the states of loops determined during a previous scanning cycle prevailed;
   e. a state of loop evaluating circuitry whose inputs are present state of loops signals, past state of loops signals and state-time signals, said evaluating circuitry including a plurality of AND-gates (8,9,10) having outputs resulting fom said present state of loops signals, said past state of loops signals and said state-time signals; and
   f. a central control unit (ZS*t*) supplied by the outputs of said AND-gates.

2. A system as specified in claim 1, wherein said state storage means (ZSp) is a circulating storage device and wherein said counting means (Z*a*Sp,Reg) include a counting register (Reg) under the joint control of the output of said logic circuitry (AVS) and of a counting storage means (Z*a*S*p*) in form of a circulating storage device whereby said counting register is advanced one counting unit as long as said present states of loops signals (*m*) and said past states of loops signals (Z) differ from each other.

3. A system as specified in claim 2 wherein a decoder (Dec) included in said state scanner (ZAT) has three outputs, two of said three outputs being connected to an OR-gate and the third output forming one of said three inputs of said plurality of AND-gates (8,9,10), and wherein said output terminal of said logic circuitry (AVS) is connected to one of the input terminals of an AND-gate (4), another input terminal of said AND-gate being connected to the output terminal of an OR-gate (6), and said AND-gate having an output terminal connected to one of input terminals of said register (Reg).

4. A system as specified in claim 3 wherein said counting storage means (Z*a*S*p*) has an input line and an output line both connected to said register (Reg).

* * * * *